United States Patent
Armstrong et al.

(10) Patent No.: US 6,580,457 B1
(45) Date of Patent: Jun. 17, 2003

(54) DIGITAL CAMERA INCORPORATING HIGH FRAME RATE MODE

(75) Inventors: Frank Armstrong, Rochester, NY (US); Mark Grabosky, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/185,038

(22) Filed: Nov. 3, 1998

(51) Int. Cl.[7] .......................... H04N 3/14; H04N 5/335
(52) U.S. Cl. ........................ 348/317; 348/302; 348/312
(58) Field of Search .............................. 348/302, 317, 348/320, 322, 312; 250/208.1

(56) References Cited

U.S. PATENT DOCUMENTS

| | | | |
|---|---|---|---|
| 3,971,065 A | | 7/1976 | Bayer |
| 4,858,020 A | * | 8/1989 | Homma ...................... 358/451 |
| 4,980,771 A | * | 12/1990 | Ueda et al. .................. 348/312 |
| 5,196,939 A | * | 3/1993 | Elabd et al. ................. 348/244 |
| 5,500,674 A | | 3/1996 | Takase et al. |
| 5,668,597 A | | 9/1997 | Parulski et al. |
| 5,909,247 A | * | 6/1999 | Hosokai et al. ............. 348/302 |
| 6,124,888 A | * | 9/2000 | Terada et al. ............... 348/302 |
| 6,130,420 A | * | 10/2000 | Tanaka et al. ............... 250/208.1 |

FOREIGN PATENT DOCUMENTS

JP 404373276 A * 12/1992

* cited by examiner

Primary Examiner—Andrew Christensen
Assistant Examiner—Eric Wisdahl
(74) Attorney, Agent, or Firm—William F. Noval

(57) ABSTRACT

A method of reading out a CCD interline image sensor having M lines×N columns of photosites, N vertical shift registers corresponding to the N columns of photosites, and a horizontal shift register, comprising the steps of: exposing the sensor to a first exposure such that all the M lines of photosites are exposed; transferring a subset of the M lines of photosites from the exposed lines of photosites to the N vertical shift registers; serially shifting each line of data from the N vertical shift registers to the horizontal shift register and reading out the horizontal shift register until all of the lines of data have been read out except for a second subset of the M lines; exposing the sensor to a second exposure such that the second subset of the M lines of photosites have remained in the sensor; and transferring the data from the exposed lines of photosites of the second exposure to the N vertical shift registers, except for the second subset of the M lines, thereby increasing the frame rate of the sensor.

2 Claims, 8 Drawing Sheets

DIGITAL CAMERA INCORPORATING HIGH FRAME RATE MODE

FIELD OF THE INVENTION

The invention relates generally to the field of electronic photography, and in particular to a digital camera capable of interfacing with a computer.

BACKGROUND OF THE INVENTION

A tethered digital camera includes a CCD (Charge Coupled Device) image sensor, an A/D (Analog-to-Digital) converter, a line store, and a digital interface which connects to a host computer via a shared bus, such as a universal serial bus (USB). The digital camera provides variable zoom, resolution, and frame rate options, which are set by the host computer. The host computer also determines which CCD image sensor pixel data is transferred from the camera to the host computer. In the telephoto zoom setting, only the central part of the image sensor data is transferred to the host computer. However, all of the lines of image sensor data must be clocked out of the CCD's vertical shift registers, even the "extra" lines at the top and bottom of the image sensor, which are not transferred to the host computer. Unfortunately, it takes time to clock out these "extra" lines, which reduces the maximum frame rate that can be achieved.

U.S. Pat. No. 5,668,597 describes an interline CCD sensor that reads out only pairs of lines in the central part of the image. Frame rate is not improved, however, since a succeeding image exposure does not begin until the vertical CCD register is completely cleared. Although scanned, MOS type sensors allow any arbitrary area of the image sensor to be read out, thus allowing the frame rate of a zoomed image to be faster, MOS sensors do not have vertical CCD storage registers so they do not have the problem of clearing these registers in the zoom mode.

U.S. Pat. No. 5,500,674, issued Mar. 19, 1996, inventors Takase et al. discloses a method of driving a solid-state image sensor having an effective pixel area formed of a plurality of pixels in an array having M pixels in the vertical direction and N pixels in the horizontal direction. A scanning pixel area formed of m pixels in the vertical direction and n pixels in the horizontal direction (where, M>m, N≧n) is established within the effective pixel area. Charges stored in the pixels in the scanning pixel area are transferred by vertical CCDs driven by a first scanning pulse to a horizontal CCD. The charges transferred to the horizontal CCD are transferred by the horizontal CCD driven by a second scanning pulse to an output portion of the horizontal CCD. Further, while the driving of the horizontal CCD is stopped, the vertical CCDs are driven by a third scanning pulse having a higher frequency than the frequency of the first scanning pulse so that charges stored in the pixels in the effective pixel area outside the scanning pixel area are transferred at high speed to the horizontal CCD of which driving is stopped. The charges transferred from the vertical CCDs to the horizontal CCD at high speed are swept out of the horizontal CCD. This method has the disadvantage of reading out all of the pixels of one image before a succeeding image can be exposed.

This invention is directed to a method for improving the frame rate of the CCD image sensor.

SUMMARY OF THE INVENTION

The present invention is directed to overcoming one or more of the problems set forth above. Briefly summarized, according to one aspect of the present invention, there is provided a method of reading out a CCD interline image sensor having M lines×N columns of photosites, N vertical shift registers corresponding to the N columns of photosites, and a horizontal shift register, comprising the steps of: exposing the sensor to a first exposure such that all M lines of photosites are exposed; transferring a subset of the M lines of data from the exposed lines of photosites of the first exposure to the N vertical shift registers; serially shifting each line of data from the N vertical shift registers to the horizontal shift register and reading out the horizontal shift register until all of the lines of data have been read out except a second subset of lines of photosites; exposing the sensor to a second exposure such that all M lines of photosites are exposed, while at least a subset of lines of photosites near the horizontal register are "double" exposed; and transferring a subset of the M lines of data from the exposed lines of photosites (comprising single and "double" exposed lines of photosites) to the N vertical shift registers; serially shifting each line of data from the N vertical shift registers to the horizontal shift register and reading out the horizontal shift register until all lines of data have been read out except the second subset of lines of photosites, thereby decreasing the frame time of the sensor.

These and other aspects, objects, features, and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the following advantages.

1. A significant increase in frame rate of a digital camera without decreasing the image quality.

2. Frame rate improvement results from reducing the number of lines which are clocked out of the imager.

DETAILED DESCRIPTION OF THE INVENTION

Figure 1:
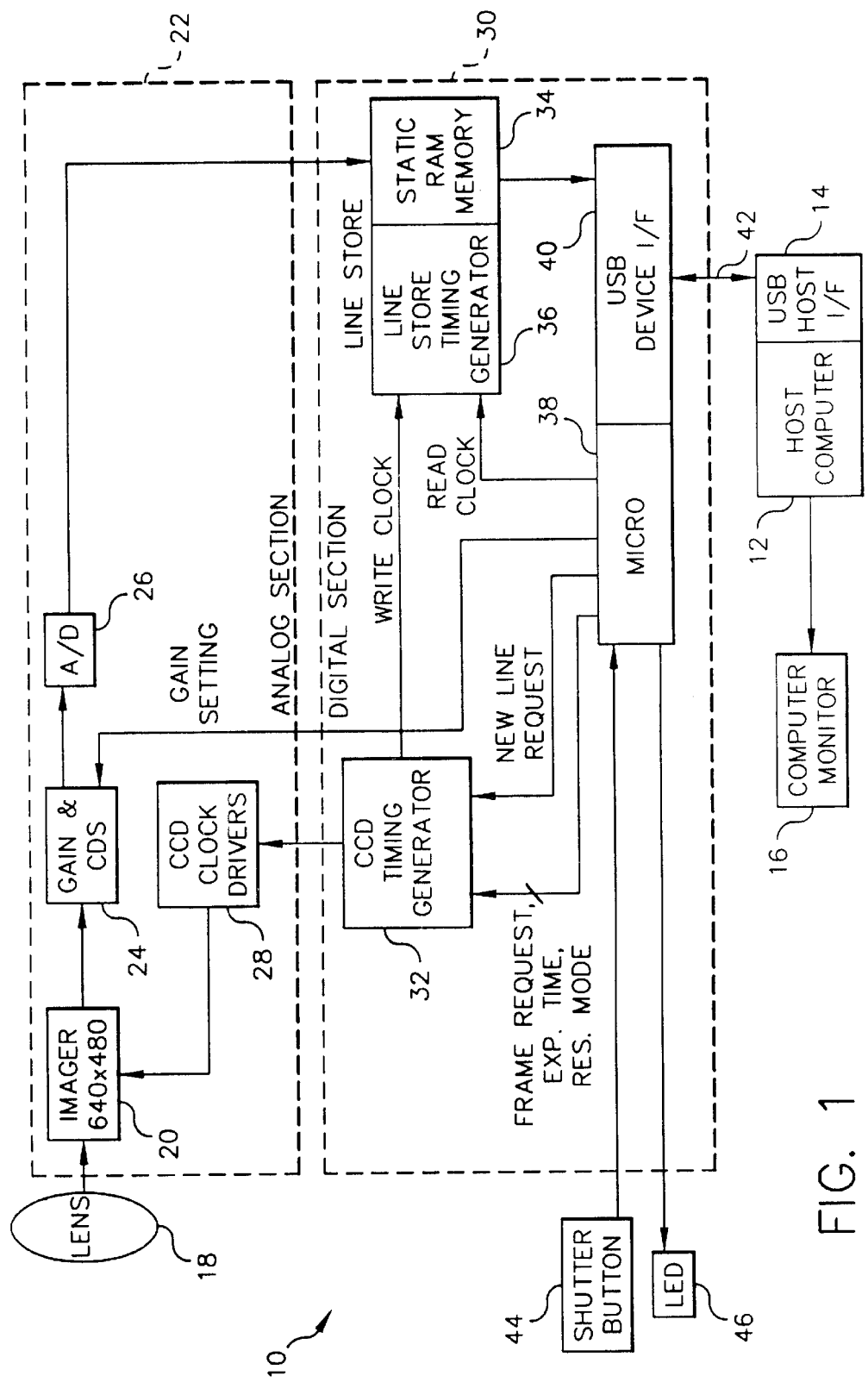
FIG. 1 is a block diagram of a digital imaging system including an embodiment of the present invention.

A block diagram of a digital imaging system according to the invention is shown in FIG. 1. The system includes a camera 10 connected to a host computer 12 via a USB (universal serial bus) digital host interface 14, which also provides power to the camera 10. USB is a well-known shared bus that can be connected to other devices, such as keyboards, printers, etc. (USB is described in the *Universal Serial Bus Specification*, 1.0 Final Draft Revision, Nov. 13, 1995. The camera 10 can acquire both still and motion images. The camera data is processed by the host computer 12 to create final images that can be displayed on a computer monitor 16, e.g., transmitted along with audio as part of a "computer videoconference", etc. The camera 10 can produce both high quality (i.e., high resolution) still images and high frame rate, reduced resolution motion images.

Figure 2:
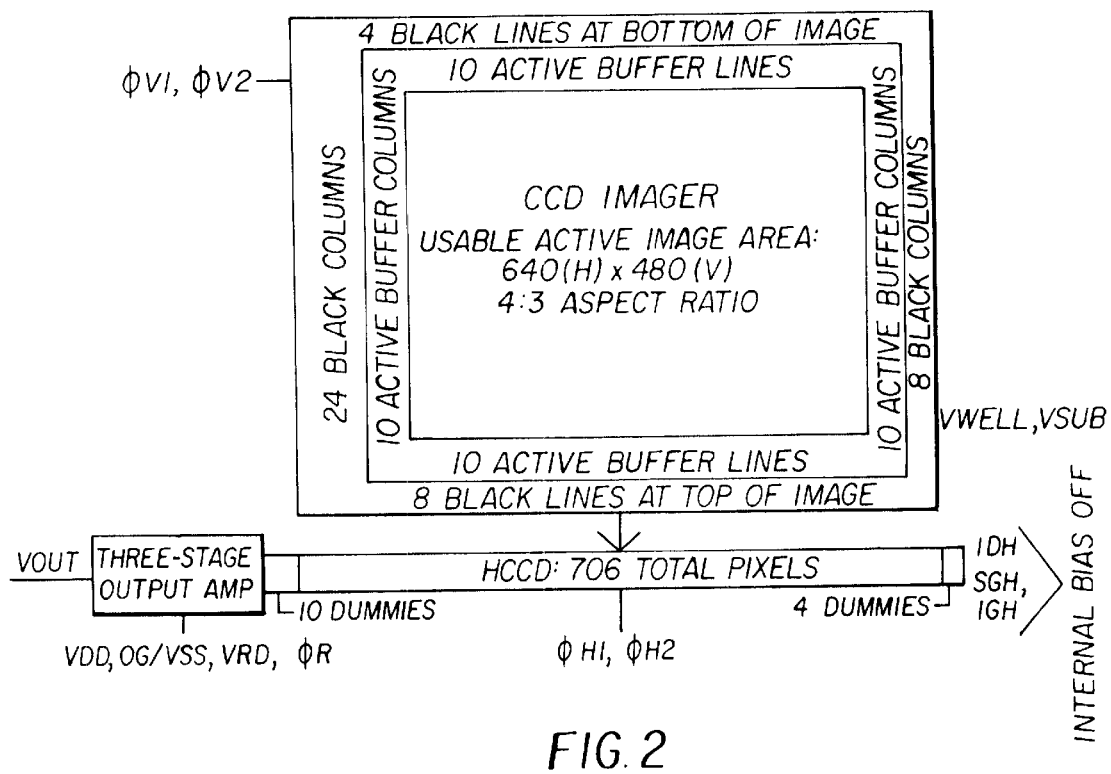
FIG. 2 is a functional block diagram of a CCD interline image sensor.

The camera 10 includes an optical section 18 for imaging light from a subject upon an electronic image sensor 20. A preferred image sensor is a Kodak KAI-0320CM interline transfer, progressive-scan charge-coupled-device (CCD) image sensor (FIG. 2) with a usable active image area having 640 columns and 480 rows of color photoelements 48 arranged in the well-known Bayer color filter array pattern shown in FIG. 3 (see U.S. Pat. No. 3,971,065 for further description of the Bayer pattern).

Figure 3:
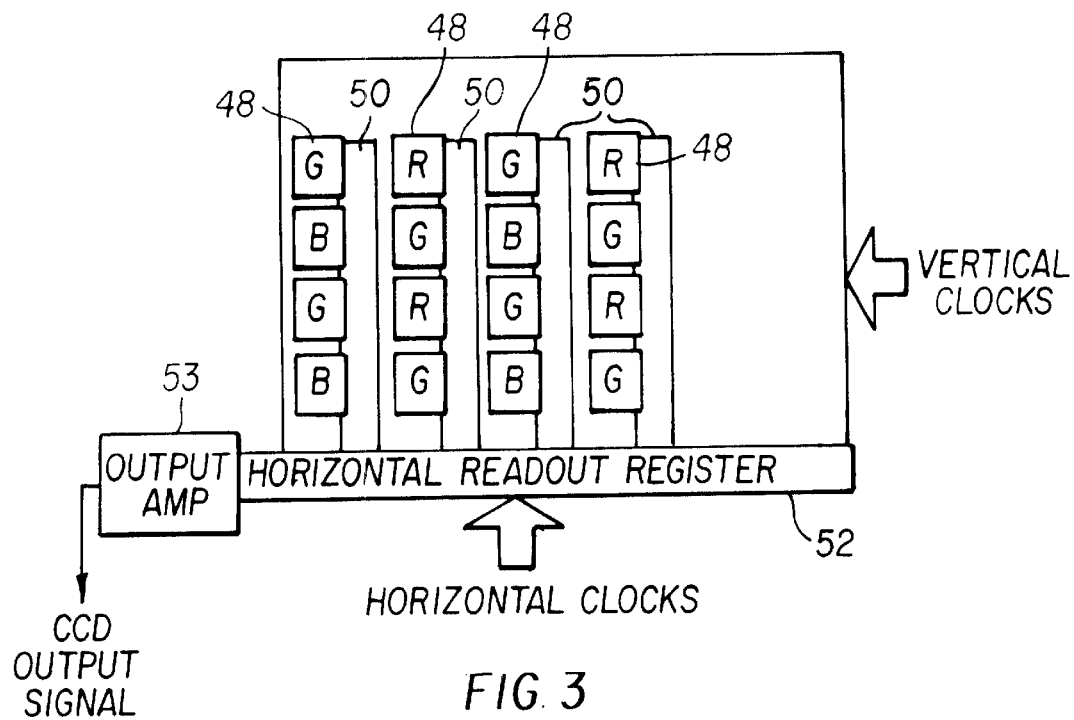
FIG. 3 is a diagrammatic view of an image sensor used in the system of FIG. 1, further illustrating the Bayer color filter pattern.

As shown in FIG. 3, the sensor 20 includes light shielded vertical registers 50, a horizontal readout register 52, and output amplifier 53.

An analog section 22 in the camera 10 includes the sensor 20, a CDS/gain block 24 for performing correlated double sampling (CDS) and setting the analog gain, an analog-to-digital (A/D) converter 26 for converting the analog output signal from the CCD sensor 20, to, e.g., an 8-bit digital signal, and CCD clock drivers 28 for clocking the sensor 20. A digital section 30 includes a CCD timing generator 32, a static RAM line store memory 34, a line store timing generator 36, a microprocessor 38, and a USB device interface 40. The USB device interface 40 connects to the USB host interface 14 by means of a USB cable 42.

The sensor 20 is controlled by the timing generator 32 via the CCD clock driver 28. The timing generator 32 has a control input for receiving a new line request signal from the microprocessor 38; the new line request signal thus initiates the generation of clock signals to output a new line from the sensor 20. The digital data from the sensor 20 is temporarily stored in the static RAM line store memory 34, preferably a 64K bit static RAM memory (for example, part number IDT7164 made by Integrated Device Technology, Inc.) which is controlled by a line store timing generator 36 so as to serve as a line store. Besides controlling the sensor 20, the CCD timing generator 32 also controls the line store write clock applied to the line store timing generator 36.

The output of the line store memory 34 is connected to the host computer 12 via the USB device interface 40, which operates at a maximum data rate of 12 M bits/sec. (see the article "Universal Serial/Bus to Simplify PC I/O", by Michael Slater in *Microprocessor Report*, Vol. 9, No. 5, Apr. 17, 1995, for more detail about the benefits of the USB interface.) The USB interface 40 (which may be incorporated as part of the microprocessor 38) reads data from the line store 34. The USB cable 42 includes four wires, one pair for sending data to and from the host computer 12, and a second pair to supply power to the camera 10 from the host. The camera 10, as shown in FIG. 1, also includes a shutter button 44 for controlling a still or motion image capture sequence and a light emitting diode (LED) 46 for indicating operation of the camera during the capture sequence (i.e., to indicate that the camera is capturing image(s)).

The host computer 12 controls the camera operation. It can instruct the camera 10 when to take still or motion pictures, and set the electronic exposure time via the CCD timing generator 32, and set the analog gain in the CDS/gain block 24 from the microprocessor 38.

An electronic representation of an image is formed when incident photons falling on the sensor plane create electron-hole pairs within the individual silicon photodiodes. These photoelectrons are collected locally by the formation of potential wells at each photosite (charge accumulation). The charge accumulation is linearly dependent on light levels and exposure time and non-linearly dependent on wavelength. This accumulated charge is then transported to the output by a three step process.

Figure 4:
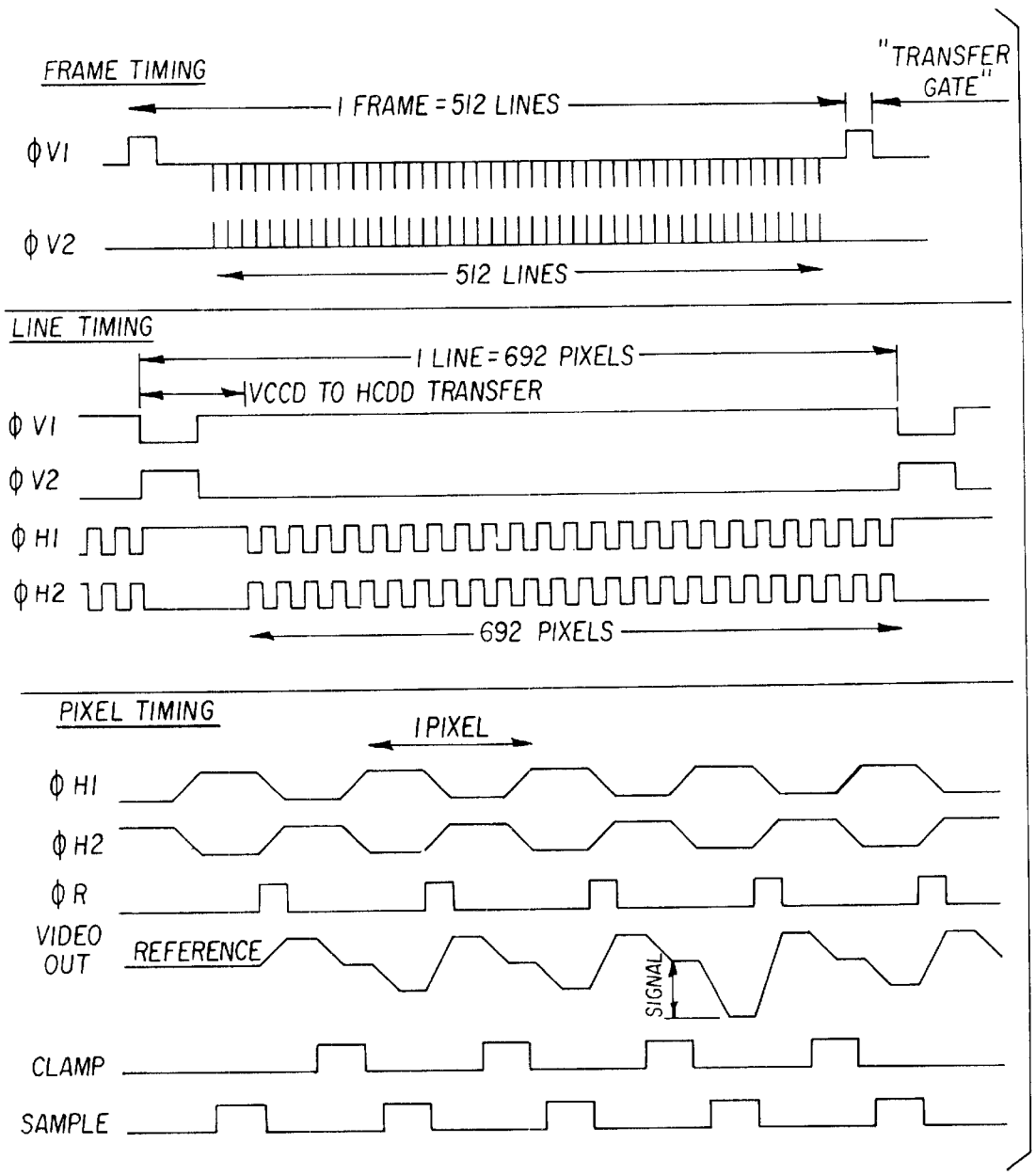
FIG. 4 is a signal timing diagram for the sensor of FIG. 2.

Refer to FIG. 4 for a pictorial representation of the timing relationships for each of the three steps. The charge is first transported from the photodiodes 48 (FIG. 3) to the vertical CCD shift registers (VCCDs) 50 (692×512 shift register elements) by applying a large positive voltage to the phase-one vertical clock (V1). This reads every row, or line, of photodiodes into the VCCDs 50. The rate at which the phase-one vertical clock is applied (also known as a "transfer gate" operation) determines the image frame time (FIG. 4, Frame Timing).

Second, the charge is then transported from the VCCDs 50 to the single horizontal CCD shift register (HCCDs) 52 line by line (512 total lines). The rate at which the charge is transferred to the HCCDs 52 is referred to as the line rate (FIG. 4, Line Timing).

Finally, the HCCD 52 transport these rows of charge packets to the output 53 pixel by pixel. The rate at which the individual pixel elements are clocked is referred to as pixel timing (FIG. 4, Pixel Timing).

From the above description, the image frame time is determined by the number of line (512) multiplied by the line rate. Note that the minimum image frame time is directly proportional to the number of lines in the image sensor.

Figure 5A:
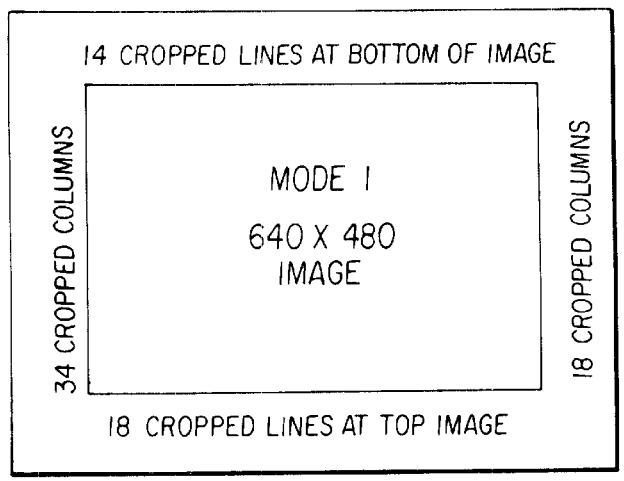
FIGS. 5a–5c are illustrative views showing cropped image formats.
Figure 5B:
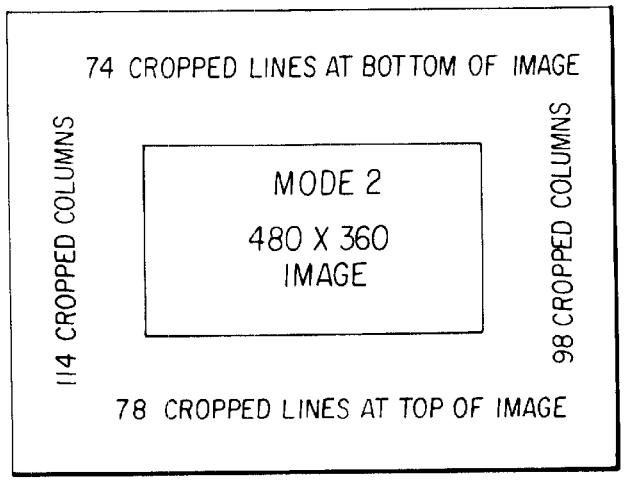
Figure 5C:
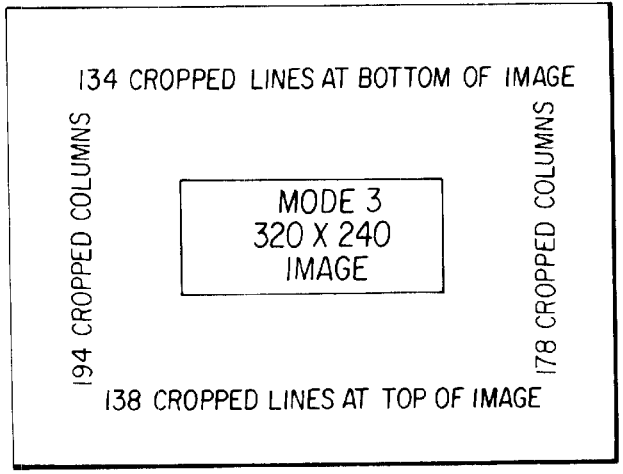

CCD image sensor 20 utilizes three video imaging modes: hereafter referred to as mode 1, mode 2, and mode 3. Table 1 shows the basic image size parameters (lines, columns) for the three modes of operation. FIGS. 5*a*–*c* pictorially depict the three image sizes on the image sensor plane. Note that mode 2 (FIG. 5*b*) is a cropped version of mode 1 (FIG. 5*a*). Similarly, mode 3 (FIG. 5*c*) is a cropped version of mode 2 (FIG. 5*b*).

TABLE 1

| VIDEO MODE | IMAGE ORIGIN | | IMAGE LENGTH | |
|---|---|---|---|---|
| | Horizontal Pixel | Vertical Pixel | Horizontal (Columns) | Vertical (Lines) |
| MODE 1 | 34 | 18 | 640 | 480 |
| MODE 2 | 114 | 78 | 480 | 360 |
| MODE 3 | 194 | 138 | 320 | 240 |

Note that the minimum image frame time is identical in all three modes given a constant number of vertical line (512) and line rate.

The conventional imager readout method consists of performing the transfer gate operation to transfer the accumulated charge from the photodiodes 48 to the VCCD registers 50. Next, each line is shifted vertically one at a time to the HCCD register 52 where each pixel is clocked out individually from the HCCD register 52. This vertical shift and horizontal clocking cycle is repeated for each line in the image sensor (512 lines) at which point the registers 50,52 (VCCD and HCCD) in the image sensor 20 are empty of charge.

Figure 6:
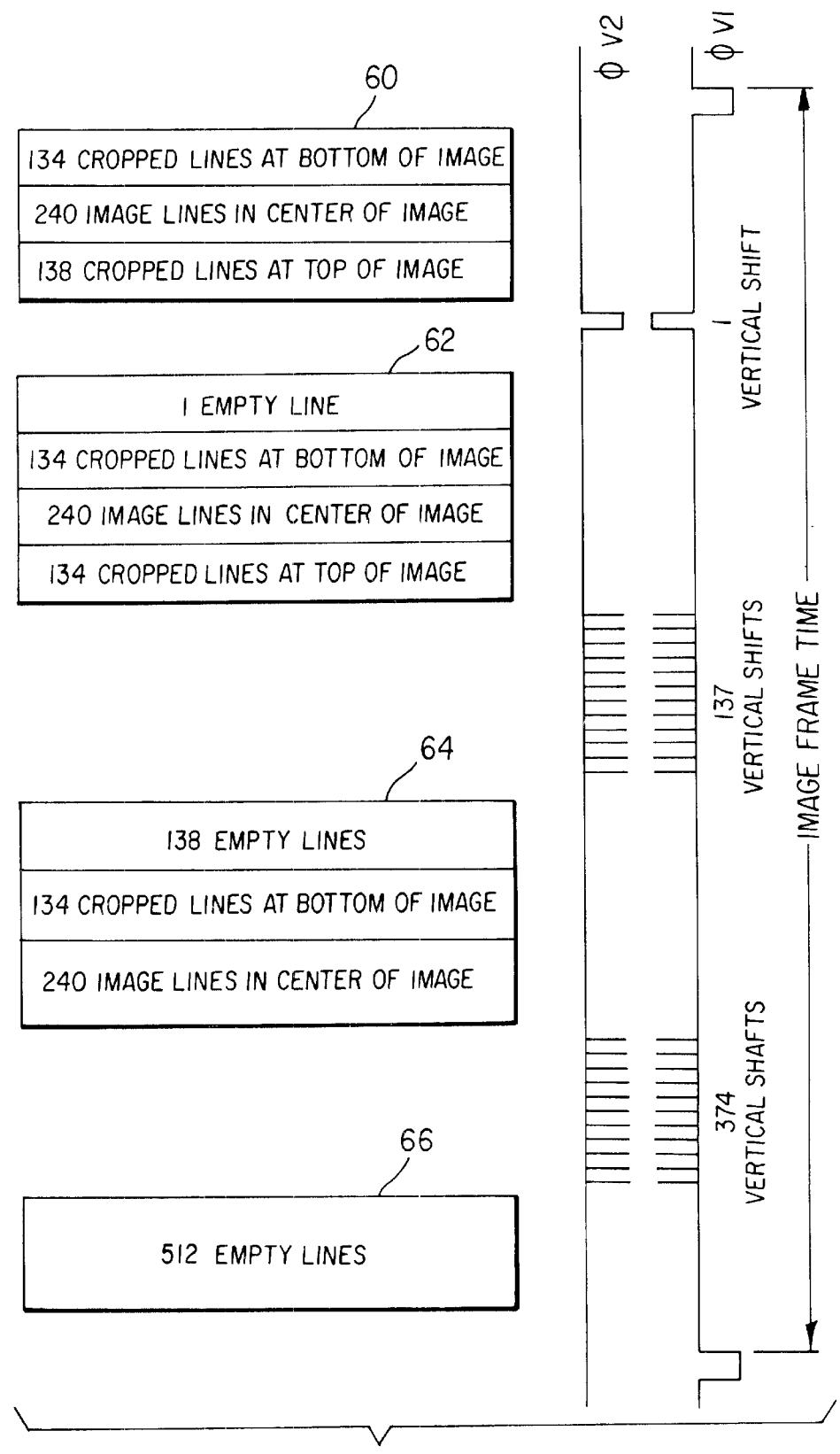
FIG. 6 is a pictorial representation of a conventional CCD image sensor readout technique using the cropped image format of FIG. 5c.

FIG. 6 pictorially illustrates the imager readout method with additional detail showing the "state" of the VCCD registers as the image is clocked out of the CCD line by line. Initially (box 60), all the VCCD registers contain charge (after the transfer gate operation), then each line is shifted vertically (boxes 62,64) until eventually (box 66) all the vertical registers are emptied of charge. The image frame time is then directly proportional to the number of image lines clocked.

According to the present invention, a new technique has been developed that optimizes the imager readout technique for centered cropped images. This technique will be referred to as fast crop. Fast crop is described for the video mode 3 (FIG. 5c) only, although applicable to all video modes and non-optimally to non-centered images a well.

Figure 7:
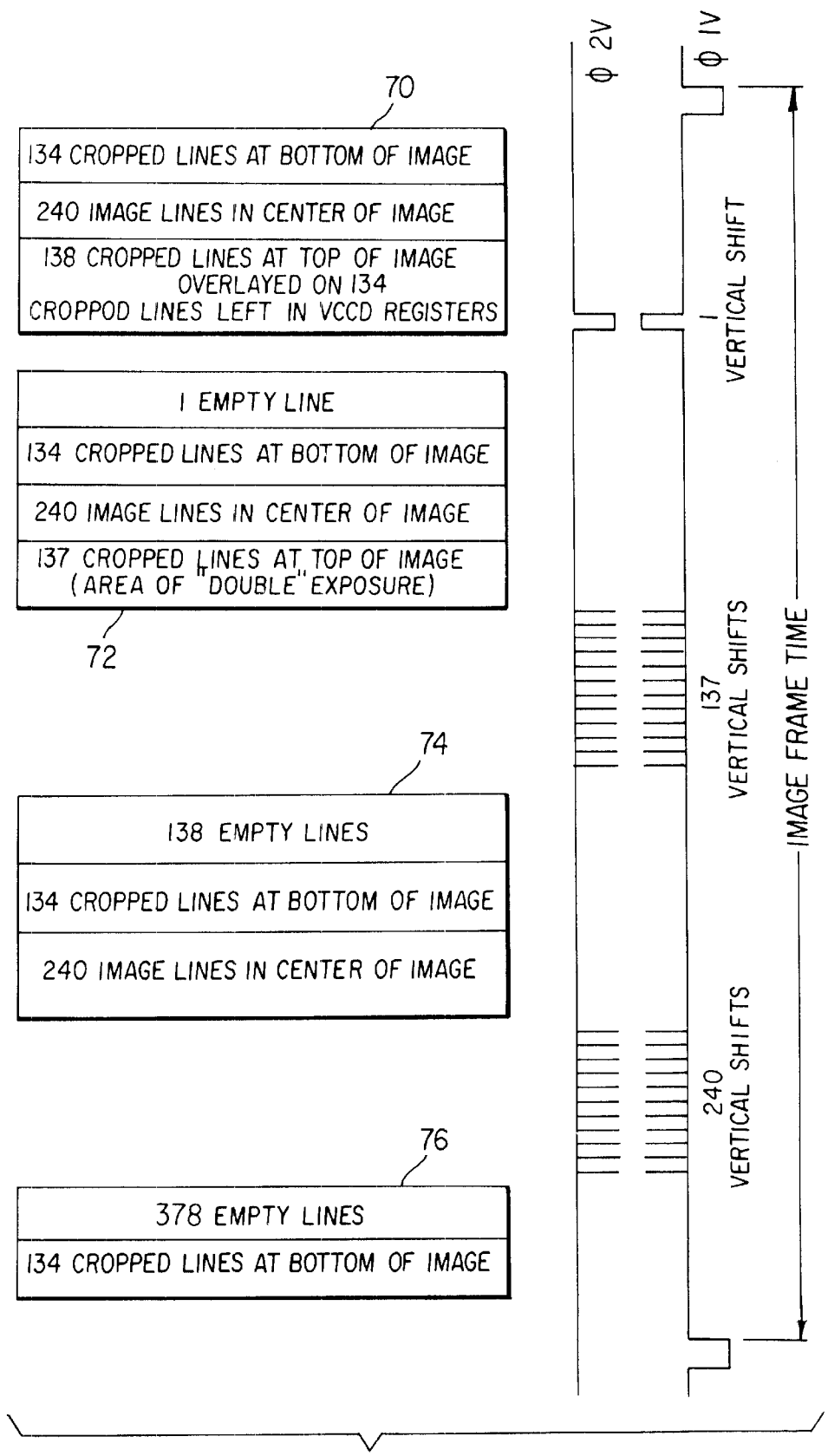
FIG. 7 is a pictorial representation of a CCD image sensor readout technique according to the invention using the cropped image format of FIG. 5c.

The fast crop technique readout method (illustrated in FIG. 7) consists of performing the transfer gate operation to transfer the accumulated charge from the photodiodes to the VCCD registers (box 70). Next (box 72), each line is shifted vertically one at a time to the HCCD register where each pixel is clocked out individually from the HCCDs register. This vertical shift and horizontal clocking cycle is repeated (box 74) only until the remaining VCCD registers that contain charge are contained within the cropped portion of the image. At this point (box 76), the VCCD registers are not clocked and the next transfer gate operation occurs. This causes the portion of the image that was not read from the VCCD registers to be "double" exposed with the charge from the next image. However, the "double" exposed pixels are contained within the crop portion of the new image and are subsequently discarded during the next image readout. For the mode 3 cropped image shown in FIG. 7, the image bottom crop portion from the previous image frame overlays the image top crop portion of the next image frame. The images remain of good quality with a faster overall frame rate. The frame rate improvement results from the reduced number of lines being clocked out of the imager.

Figure 8:
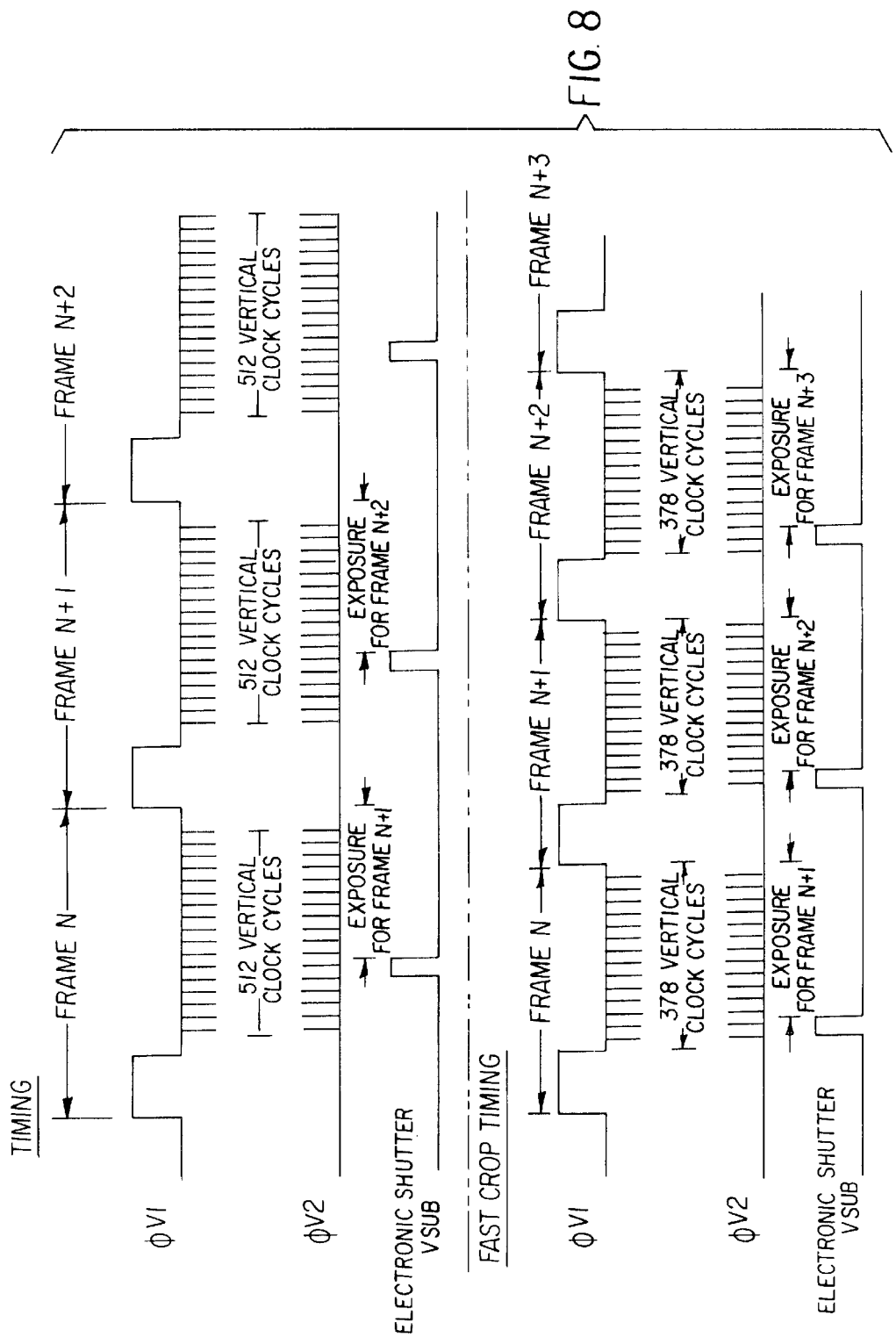
FIG. 8 is a timing signal diagram comparing the techniques of FIG. 6 and FIG. 7.

FIG. 8 compares waveform timing relationships of the fast crop readout method of the present invention with the conventional readout method. In video mode, according to the invention, the exposure time for the next image frame begins while the current frame is being read out. A constant exposure time is necessary for the series of images in a motion sequence to prevent flicker. The constant exposure time occurs by providing the electronic shutter pulse at a known time prior to the beginning of the next image frame.

The improvement in frame rate between the conventional method and the fast crop method is directly proportional to the reduced number of lines clocked out of the imager. For example, the video mode 3 experiences a frame rate improvement of 26% (378/512). The video mode 2 experiences a frame rate improvement of 18% (418/512).

Note that smaller cropped images experience proportionately larger increases in frame rate. This technique is optimal when the cropped image is centered in the image sensor window. Although, non-centered cropped images can also achieve a frame rate improvement.

Figure 9:
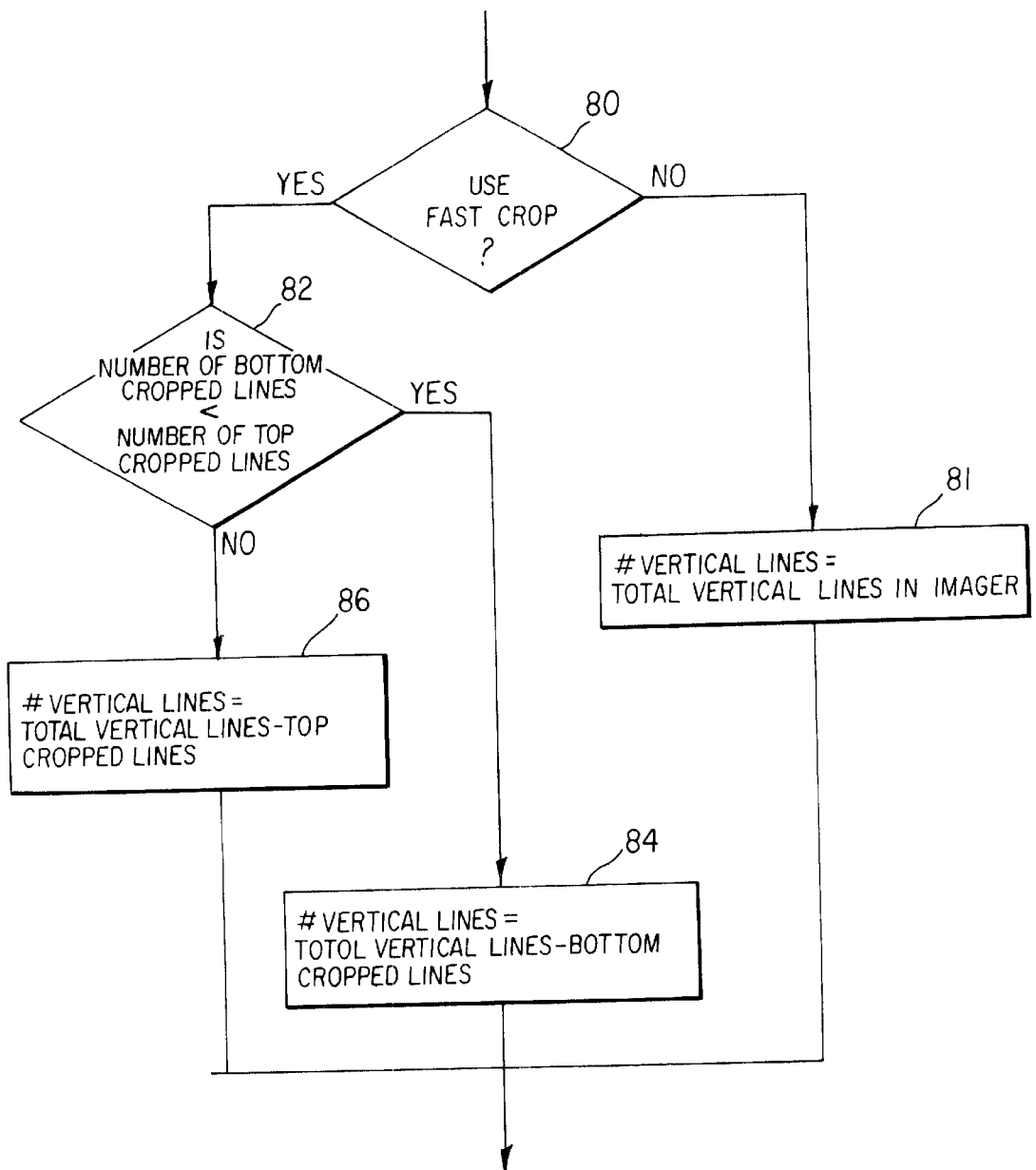
FIG. 9 is a flow diagram of the method of the present invention.

FIG. 9 shows the algorithm developed for programming fast crop. If the decision (diamond 80) is not to use the fast crop readout method, the number of lines read out are equal to the total lines in the imager (box 81). If the fast crop readout mode is used (diamond 80), it is determined (diamond 82) whether the number of bottom cropped lines are less than the number of the top cropped lines. If yes, the number of lines read out equals the total lines in the imager minus the number of bottom cropped lines (box 84). If no, the number of lines read out equals the total lines in the imager minus the number of top cropped lines.

The invention has been described with reference to a preferred embodiment; however, it will be appreciated that variations and modifications can be effected by a person of ordinary skill in the art without departing from the scope of the invention. Thus, although a specific image sensor having an active image area of 640(H)×480(V) pixels has been described, it will be understood that the method of the present invention is applicable to an image sensor of any size other than that described. Further, the size of the image in the cropped mode can be other than the illustrative sizes described above.

PARTS LIST 10 camera
12 host computer
14 digital host interface
16 computer monitor
18 optical section
20 electronic image sensor
22 analog section
24 CDS/gain block
26 A/D converter
28 CCD clock drivers
30 digital section
32 CCD timing generator
34 static RAM line store memory
36 line store timing generator
38 microprocessor
40 USB device interface
42 USB cable
44 shutter button
46 light emitting diode (LED)
48 photodiodes
50 light shielded vertical registers
52 horizontal readout register
53 output structures

What is claimed is:

1. A method of reading out a CCD interline image sensor having M lines×N columns of photosites, N vertical shift registers corresponding to said N columns of photosites and a horizontal shift register coupled to said N vertical shift registers, comprising the steps of:

configuring said sensor to include first, second, and third sets of contiguous lines of photosites inclusive of all of said M lines of photosites;

wherein the number of lines in said first and third sets are substantially equal;

exposing said sensor to a first frame such that all of said M lines of photosites are exposed;

transferring all of said M lines of photosites to said N vertical shift registers;

serially shifting each line of data from said N vertical shift register and reading out said horizontal shift register until all of said lines of data of said first and second sets of contiguous lines have been read out, wherein said third set of lines have not been read out of said vertical shift registers;

exposing said sensor to a second frame such that all of said M lines of photosites are exposed;

transferring all of said M lines of photosites to said N vertical shift registers such that the first set of lines of photosites of said second frame are accumulated with said third set of lines of photosites of said first frame; and repeating said serially shifting step;

wherein said frame rate of said sensor is increased by a factor of the number of lines in said first and second sets divided by M lines of said sensor.

2. The method of claim 1 wherein said method is carried out by a camera including user actuated controls for controlling said configuring and exposing steps.

* * * * *